(12) United States Patent
Lee

(10) Patent No.: US 6,988,158 B2
(45) Date of Patent: Jan. 17, 2006

(54) HOT PLUG CIRCUIT FOR ENCLOSURE MANAGEMENT SYSTEMS USED TO MANAGE SUB-SYSTEMS AND METHOD THEREOF

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 323 days.

(21) Appl. No.: 10/372,820

(22) Filed: Feb. 26, 2003

(65) Prior Publication Data

US 2004/0168006 A1   Aug. 26, 2004

(51) Int. Cl.
*G06F 13/00* (2006.01)

(52) U.S. Cl. .................... 710/302; 710/304; 713/1; 713/2

(58) Field of Classification Search ........ 710/300–306, 710/312–317, 8–19, 2–3, 36, 62–64, 72; 713/1–2
See application file for complete search history.

(56) References Cited

U.S. PATENT DOCUMENTS

| | | | |
|---|---|---|---|
| 5,117,430 A * | 5/1992 | Berglund ................... 370/408 |
| 5,664,119 A * | 9/1997 | Jeffries et al. .............. 710/302 |
| 6,199,130 B1 * | 3/2001 | Berglund et al. ........... 710/302 |
| 6,351,819 B1 * | 2/2002 | Berglund et al. ........... 713/310 |
| 6,507,882 B1 * | 1/2003 | Golka et al. ................ 710/302 |
| 6,519,663 B1 * | 2/2003 | Osten et al. ................ 710/100 |
| 6,525,926 B1 * | 2/2003 | Chen ......................... 361/683 |
| 6,535,944 B1 * | 3/2003 | Johari et al. ............... 710/302 |
| 6,554,170 B1 * | 4/2003 | Wilder et al. .............. 725/130 |
| 6,742,068 B2 * | 5/2004 | Gallagher et al. .......... 710/302 |
| 6,807,596 B2 * | 10/2004 | Erickson et al. ........... 710/301 |
| 2003/0105904 A1 * | 6/2003 | Abbondanzio et al. ..... 710/302 |
| 2004/0015629 A1 * | 1/2004 | Inui et al. .................. 710/300 |

* cited by examiner

Primary Examiner—Tim Vo

Assistant Examiner—Raymond N Phan

(74) Attorney, Agent, or Firm—Birch, Stewart, Kolasch & Birch, LLP

(57) ABSTRACT

A system and method are disclosed for hot plugging an enclosure management system. Enclosure management system is used in the sub-systems within data management and processing systems. The system and method for hot plugging include: a display unit, a detecting unit, and working with data processing system software to provide hot plug capability. The invention will increase the working efficiency for the data processing system.

8 Claims, 4 Drawing Sheets

HOT PLUG CIRCUIT FOR ENCLOSURE MANAGEMENT SYSTEMS USED TO MANAGE SUB-SYSTEMS AND METHOD THEREOF

BACKGROUND OF THE INVENTION

1. Field of Invention

The invention is related to a circuit that allows components in the computer systems to be hot plugged, and more particular to a hot plug circuit for enclosure management system.

2. Related Art

Due to advancing computer technology, the need for efficient data processing has increased dramatically. The systems performing data processing tasks often include multiple additional sub-systems forming a group of servers, to be able to satisfy increasing demands. Enclosure management systems, or EM systems, are created to centralize the management of these sub-systems within the data processing servers.

The traditional EM systems provide overhaul and easy control of the sub-systems, but it is not without problems. For example, if an EM system has service problems, due to the lack of capability to communicate with the users by displaying current conditions, it is difficult to detect the problems. Also, if the working EM system needs to be repaired, the whole information processing system has to be shut down, in order to allow replace the EM system.

This process is very inefficient and the system's ability to perform tasks is delayed. Allowing users to grasp current EM system conditions and simplify repairing processes when problems occur, are issues waiting to be solved.

SUMMARY OF THE INVENTION

The invention provides a hot plug capability for enclosure management systems. Enclosure management systems are used to manage sub-systems within data management and processing systems. The hot plug circuit and the method include: a display unit for displaying the working conditions of the ME system, a detection unit for detecting the working conditions of the information processing system when hot plugging, and working with system software to provide hot plug capability. The invention increases the working efficiency of the data processing system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the description below only, and thus are not limitative of the present invention.

DETAILED DESCRIPTION OF THE INVENTION

Figure 1A:
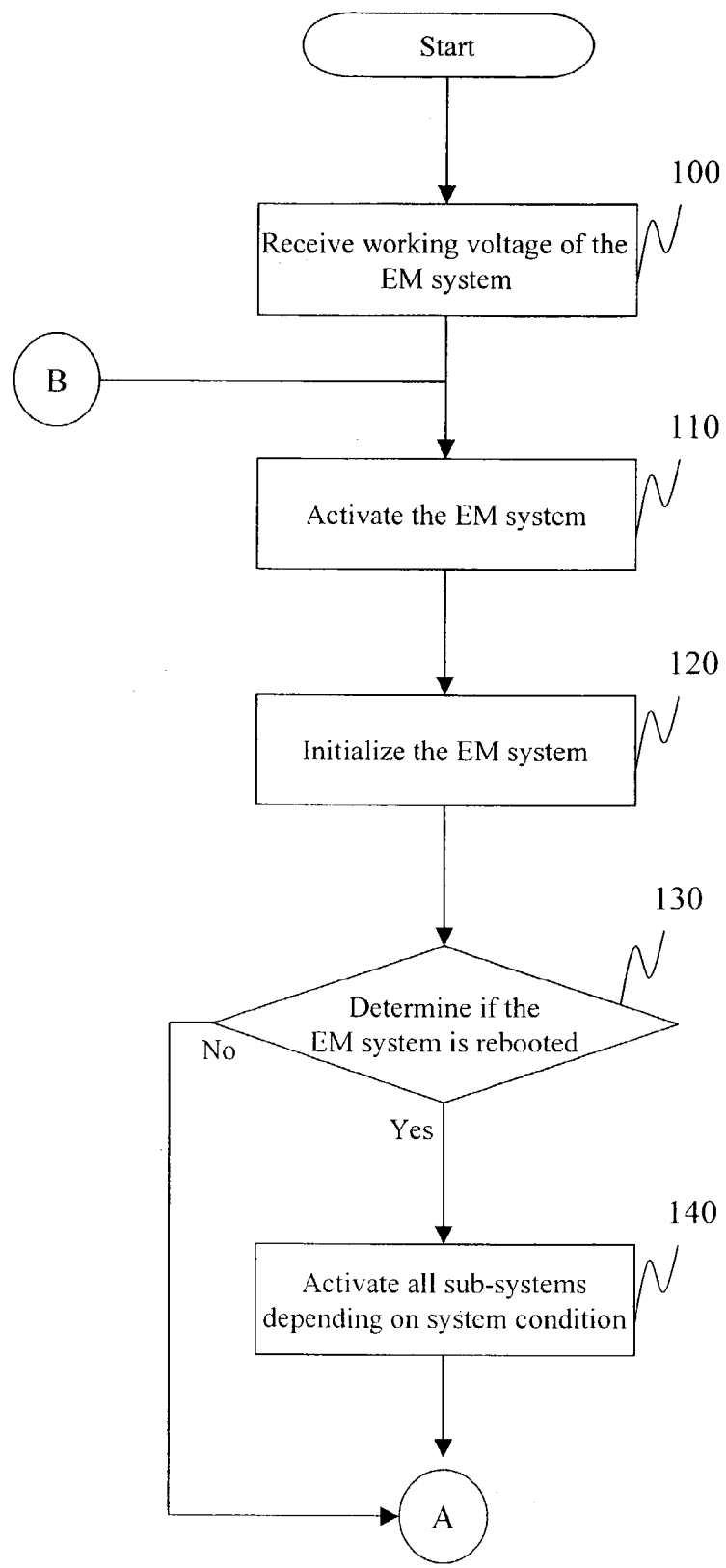
FIG. 1A illustrates, in flow diagram form, part 1 of the system allowing hot plugging enclosure management systems.
Figure 1B:
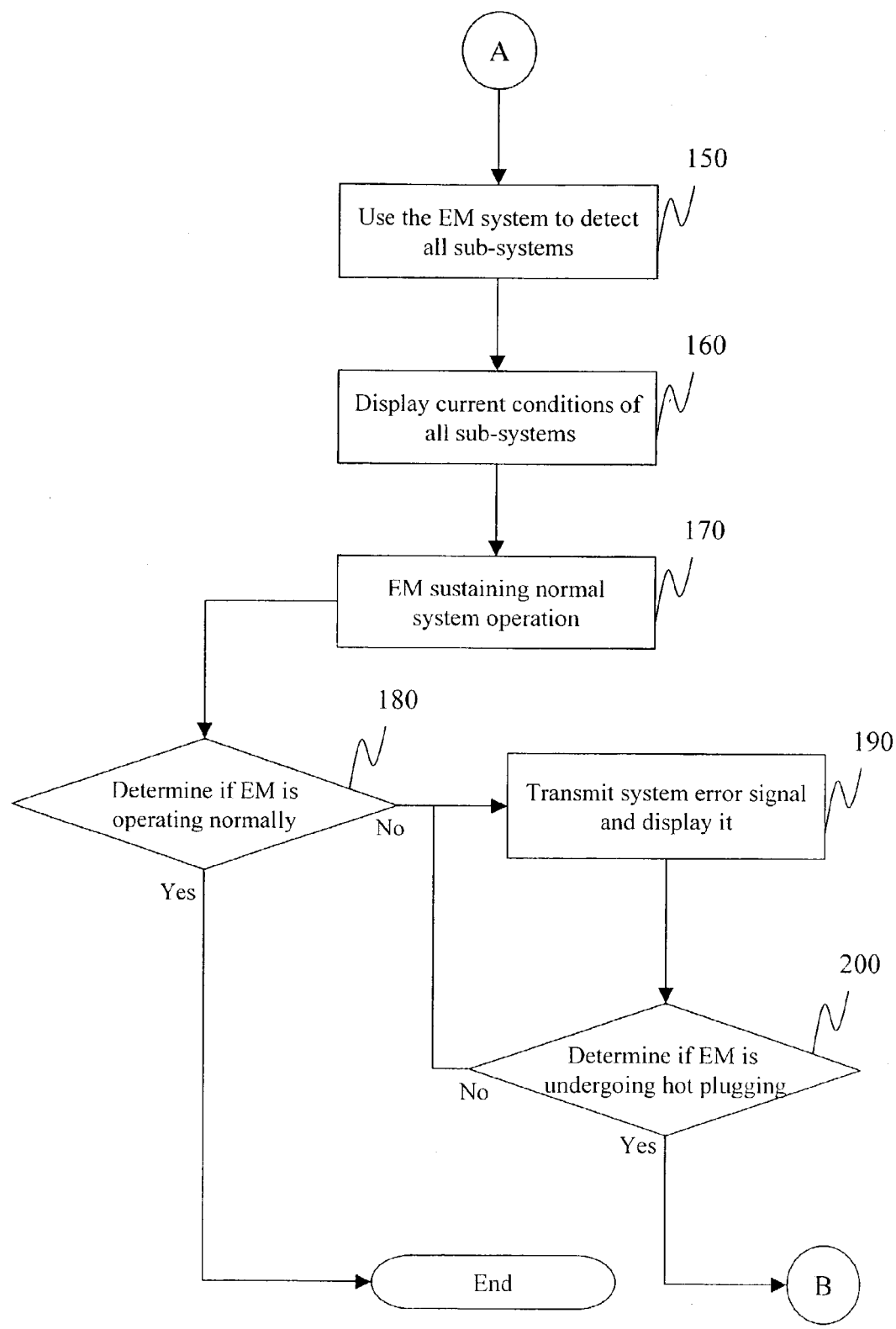
FIG. 1B illustrates, in flow diagram form, part 2 of the system allowing hot plugging enclosure management systems.

This invention provides hot plug capability for enclosure management systems. The EM system is placed in a data processing system to manage the multiple sub-systems. Please refer to FIG. 1A and FIG. 1B for the flow diagrams illustrating the method for allowing hot plugging of enclosure management systems.

The invention starts operating by receiving the working voltage of the EM system (step 100), and turning on the EM system (step 110). It initializes the EM system (step 120) by: setting the EM system's monitoring schedule and reading the EM system's EEPROM (electrically erasable programmable read-only memory). It also determines if the information processing system is rebooted (step 130) at the same moment. If the processing unit is rebooted, all sub-systems need to be initialized accordingly (step 140). If the system is not being rebooted, then use the EM system to detect the conditions of the sub-systems (step 150) and display the current working conditions of the EM system (step 160). It will sustain normal operating conditions (step 170) and determine if the working EM system is behaving normally (step 180). If the EM system has trouble, the circuit transmits an abnormal-signal and displays it (step 190). It also verifies if the EM system is hot plugged while the abnormal condition occurs (step 200). If the system is not undergoing the hot plug process, then the error condition is real. The abnormal signal will be transmitted continuously to remind users of the problem. If the EM system is undergoing the hot plug process while errors are detected, then at the end of the hot plug procedure, the system turns back to step 110 and continues operating.

Figure 2:
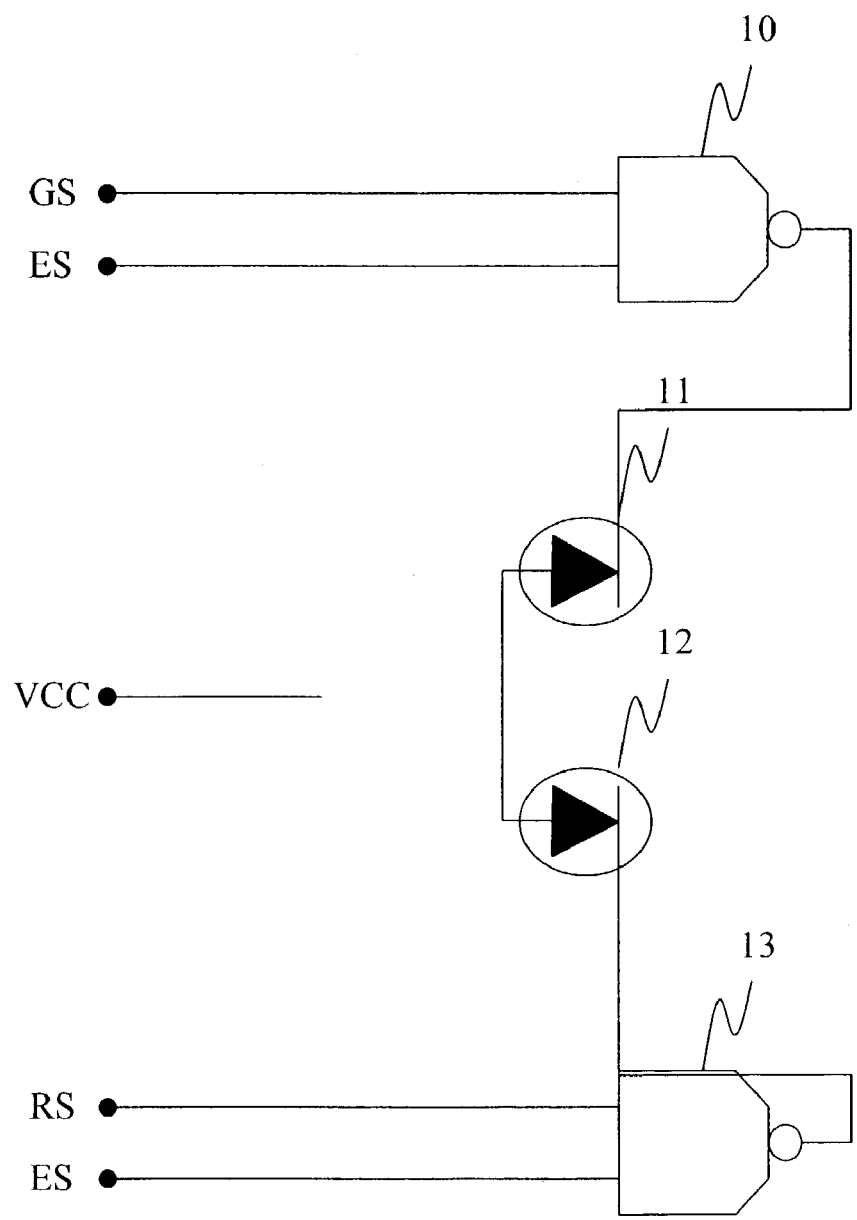
FIG. 2 illustrates, in block diagram form, a display unit for the system allowing hot plugging for enclosure management systems.

The sub-systems in the information processing system include peripherals such as: cooling systems, connection interfaces, KVM switching systems, bus systems, etc. The following describes the physical parts of the invention, which are for hot plugging of the EM system. Please refer to FIG. 2 for references.

The invention includes a display unit showing the current conditions of the EM system. This display unit has: a first detection element 10, a first display element 11, a second display element 12, and a second detection element 14. The first detection element 10 and the second detection element 14 are NAND gates. The first display element 11 and the second display element 12 are LEDs (Light Emitting Diodes). One of the inputs of the first detection element 10 is the enable signal, ES; the other input is the general signal, GS, indicating that all systems are normal. The output of the first detection element 10 is connected to the first display element 11. One of the inputs of the second detection element 13 is also the enable signal, ES, and the other input is the error signal, RS. The output of the second detection element 13 is connected to the second display element 12. The other terminals of the first display element 11 and the second display element 12 are connected to the working voltage (VCC). When the EM system is under normal operating condition, the enable signal and 'system normal' signal are generated internally and they change the state of the first detection element 10, the NAND gate, to low. Then the first detection element 10 triggers the first display element 11 to be turned on, which indicates 'system operating normally'. The second display element 12 does not work. When the EM system has problems, the EM system stops transmitting the 'system normal' signal, so the first detection element 10 is changed to 'high'. In this case, the first display element 11 does not work, which causes an error signal and changes the second detection element 13 to 'low'. The second display element 12 then emits light, indicating system trouble.

Figure 3:
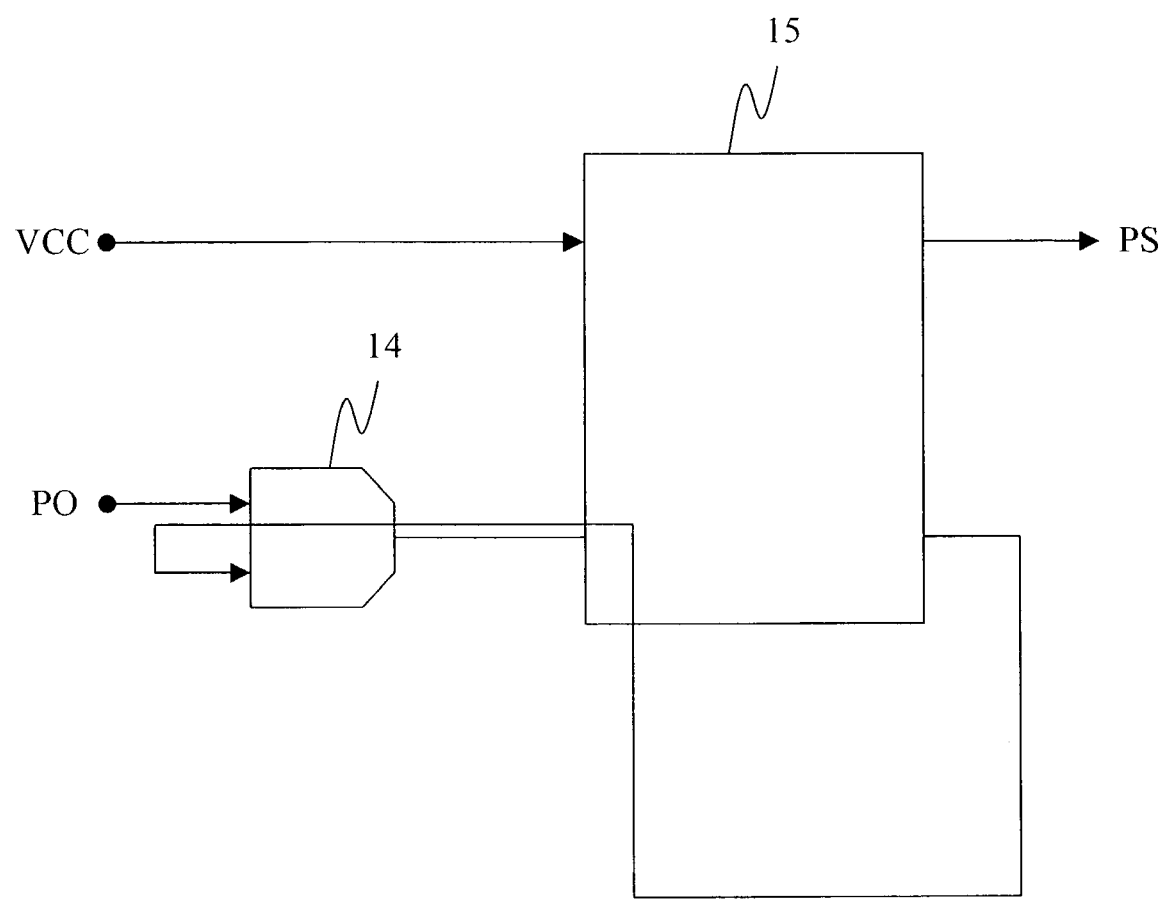
FIG. 3 illustrates, in block diagram form, a detecting unit for the system allowing hot plugging for enclosure management systems.

FIG. 3 displays the detection unit of the system for hot plugging the EM system. The detection unit of the hot plug circuit includes a power detecting element 14 and a determining element 15. The detecting element 14 is a logical gate and the determining element 15 is a delay flip-flop. The detecting element 14 has a working power input PO and the other input is connected to the inverted output of the determining element 15. The output of the detecting element 14 is connected to the clock input of the determining element 15. The input of the determining element 15 is connected to the working voltage of the EM system, VCC. The non-inverted output of determining element 15 is the power condition output, PS. When the EM system is undergoing hot plug operation, the detecting element 14 receives the system's working voltage and the inverted signal in the last clock of the determining element 15. It is then changed to the correct state, and the output is transmitted to the determining element 15. The determining element 15 then uses the received the result from the detecting element 14 to decide if the data processing system is being rebooted. The determining element 15 transmits the result of the booting condition using the power condition output, PS.

It is concluded that this invention, which is for hot plugging the EM system, permits the use of the hot plug method to switch off problematic EM systems, instead of requiring shutting down the whole data processing system. It also includes display-system conditions for convenient monitoring by users. The detection unit detects the data processing system's condition and determines if the system is working, or in the process of restarting. The result is used to decide if all sub-systems need to be re-initialized.

The invention being thus described as above, it will be obvious that the same may be varied in many ways. Such variations are not to be regarded as a departure from the spirit and scope of the invention, and all such modifications, as would be obvious to one skilled in the art, are intended to be included within the scope of the following claims.

What is claimed is:

1. A hot plug method for an enclosure management system, which is situated within a data processing system to manage multiple sub-systems, comprising the steps of:
   receiving working voltage, starting the enclosure management system, and then initializing the sub-systems;
   checking the data processing system and using the enclosure management system to check all multiple sub-systems;
   displaying the enclosure management system condition and maintaining the data processing's normal operations;
   detecting the condition of the enclosure management system and displaying an abnormal signal when the enclosure management system is an abnormal condition; and
   checking the enclosure management system's hot plugging process, and when hot plugging is completed, returning to the start up process of the enclosure management system and continuing operating,
   wherein said the initializing step of the enclosure management systems further comprises the steps of: setting the EM system's monitoring schedule; and reading the EM system's EEPROM (electrically erasable programmable read-only memory).

2. The hot plug method of claim 1, wherein said the step of detecting the data processing system further comprises the steps of initializing the multiple sub-systems when the enclosure management system is a normal condition.

3. The hot plug method of claim 1, wherein said steps of checking the enclosure management system's hot plugging process continues producing an error signal when the data processing system is not being hot plugged.

4. The hot plug method of claim 1, wherein said the multiple sub-system comprises cooling systems.

5. The hot plug method a of claim 1, wherein said the multiple sub-system comprises connecting interfaces systems.

6. The hot plug method of claim 1, wherein said the multiple sub-system comprises KVM switching systems.

7. The hot plug method of claim 1, wherein said the multiple sub-system comprises bus systems.

8. A hot plug circuit for an enclosure management system, which is situated within a data processing system comprising:
   a display unit, which is used to display a condition of the enclosure management system, comprising:
     a first detecting element, which is used to receive a normal operating sign and in turn transmit a normal signal;
     a first display element, which is connected to the first detecting element, used to receive the normal signal from the first detecting element and display it;
     a second detecting element, which is used to receive a system error signal and a working signals, then transmit an error signal afterwards; and
     a second display element, which is connected to the second detecting element, for receiving the error signal and displaying it;
   a detecting unit, which is used to detect a booting condition of the data processing system, comprising:
     a voltage detecting element, which is used to receive the working voltage and then transmit a detecting signal to an output; and
     a determining element, which is connected to the voltage detecting element, used to receive the detecting signal, analyze it and then transmit it to the enclosure management system.

* * * * *